US012609619B2

(12) United States Patent
Li et al.

(10) Patent No.: US 12,609,619 B2
(45) Date of Patent: Apr. 21, 2026

(54) MULTI-MODE BUCK-BOOST CONVERTER AND CONTROL METHOD WITH SHARED CAPACITOR

(71) Applicant: Joulwatt Technology Co., Ltd., Hangzhou (CN)

(72) Inventors: Linjue Li, Hangzhou (CN); Yangwei Yu, Hangzhou (CN)

(73) Assignee: JOULWATT TECHNOLOGY (HANGZHOU) CO., LTD, Hangzhou (CN)

( * ) Notice: Subject to any disclaimer, the term of this patent is extended or adjusted under 35 U.S.C. 154(b) by 155 days.

(21) Appl. No.: 18/487,512

(22) Filed: Oct. 16, 2023

(65) Prior Publication Data

US 2024/0146197 A1 May 2, 2024

(30) Foreign Application Priority Data

Oct. 31, 2022 (CN) .......................... 202211342913.2

(51) Int. Cl.
*H02M 3/158* (2006.01)
*H02M 1/00* (2007.01)
(Continued)

(52) U.S. Cl.
CPC ....... *H02M 3/1582* (2013.01); *H02M 1/0003* (2021.05); *H02M 1/14* (2013.01); *H02M 1/38* (2013.01); *H02M 3/07* (2013.01)

(58) Field of Classification Search
CPC .......... H02M 3/07; H02M 3/073; H02M 7/10; H02M 7/103; H02M 7/106; H02M 1/088;

H02M 2003/071; H02M 2003/072; H02M 2003/075; H02M 2003/076; H02M 2003/077; H02M 2003/078; H02M 2001/007; H02M 2001/0048; H02M 5/2573; H02M 1/081; H02M 5/293; H02M 7/12; H02M 3/10; H02M 3/125; H02M 3/13; H02M 3/135; H02M 3/145; (Continued)

(56) References Cited

U.S. PATENT DOCUMENTS 10,547,241 B1 * 1/2020 Li ........................ H02M 3/1588
10,587,189 B1 * 3/2020 Ausseresse ............. H02M 3/07
(Continued)

FOREIGN PATENT DOCUMENTS

CN 109617148 8/2020
CN 110323935 9/2020
(Continued)

*Primary Examiner* — Crystal L Hammond
*Assistant Examiner* — Nusrat Quddus
(74) *Attorney, Agent, or Firm* — Treasure IP group, LLC

(57) ABSTRACT

The present disclosure relates to a buck-boost converter and a control method therefor. The buck-boost converter includes a boost unit and a buck unit. The boost unit has a first capacitor and a first group of switches. The buck unit has an inductor and a second group of switches. The buck-boost converter has a cascaded structure of the boost unit and the buck unit to achieve multiple voltage conversion modes. The inductor of the buck unit is coupled to the output terminal. Therefore, not only can it achieve a smooth transition of the DC output voltage, but also reduce voltage ripple and improve dynamic response speed.

13 Claims, 6 Drawing Sheets

(51) Int. Cl.
  *H02M 1/14*          (2006.01)
  *H02M 1/38*          (2007.01)
  *H02M 3/07*          (2006.01)

(58) Field of Classification Search
  CPC ........ H02M 3/15; H02M 3/155; H02M 3/156;
            H02M 3/158; H02M 3/1588; H02M
            2003/1566; H02M 3/1582; H02M
            2003/1557; G05F 1/00; G05F 1/10; G05F
            1/12; G05F 1/46; G05F 1/455; G05F
            1/45; G05F 1/445; G05F 1/66; G05F
            1/40; G05F 1/42; G05F 1/44; G05F
            1/462; G05F 1/52; G05F 1/56; G05F
            3/10; G05F 3/16; G05F 3/18; G05F
            3/185; G05F 3/20; G05F 3/26; G05F
            3/30; G05F 3/205; G05F 3/22; G05F
            3/24; G05F 3/222; G05F 3/242; G05F
            3/225; G05F 3/227; G05F 3/245; G05F
            3/247; G05F 3/262; G05F 3/265; G05F
            3/267; G05F 1/575; H05B 39/048; B23K
            11/24; H04B 2215/069
  See application file for complete search history.

(56)              References Cited

U.S. PATENT DOCUMENTS

| | | | | |
|---|---|---|---|---|
| 11,251,708 | B2 * | 2/2022 | Park | H02M 3/1582 |
| 11,522,466 | B1 * | 12/2022 | Li | H02M 7/4837 |
| 11,532,987 | B2 * | 12/2022 | Han | H02M 1/0058 |
| 11,539,289 | B2 * | 12/2022 | Khlat | H02M 3/07 |
| 11,563,377 | B2 * | 1/2023 | Ruggeri | H02M 1/0095 |
| 11,581,796 | B2 * | 2/2023 | Yan | H02M 1/0025 |
| 11,929,672 | B2 * | 3/2024 | Petersen | H02M 3/158 |
| 11,990,831 | B2 * | 5/2024 | Petersen | G06F 1/3206 |
| 12,155,303 | B2 * | 11/2024 | Kawano | H02M 3/158 |
| 2010/0156368 | A1 * | 6/2010 | Huynh | H02M 3/07 |
| | | | | 307/43 |
| 2013/0043932 | A1 * | 2/2013 | Khlat | H02M 3/07 |
| | | | | 327/536 |
| 2014/0062449 | A1 * | 3/2014 | Qu | G05F 3/02 |
| | | | | 323/311 |
| 2015/0022164 | A1 * | 1/2015 | Ye | H02M 1/4208 |
| | | | | 323/210 |
| 2017/0163157 | A1 * | 6/2017 | Petersen | H02M 1/0095 |
| 2019/0149044 | A1 * | 5/2019 | Itoh | H02M 1/088 |
| | | | | 363/123 |
| 2020/0295655 | A1 * | 9/2020 | Takahiro | H02M 3/073 |
| 2021/0036604 | A1 * | 2/2021 | Khlat | H02M 3/07 |
| 2021/0175805 | A1 * | 6/2021 | Mercer | H02M 1/08 |
| 2022/0231607 | A1 * | 7/2022 | Dragojevic | H02M 3/1588 |
| 2022/0286051 | A1 * | 9/2022 | Cannillo | H02M 3/07 |
| 2022/0302827 | A1 * | 9/2022 | Tarroboiro | H02M 3/158 |
| 2022/0345042 | A1 * | 10/2022 | Ruggeri | H02M 1/0095 |
| 2023/0057337 | A1 * | 2/2023 | Nicholson | H02M 3/158 |
| 2023/0268835 | A1 * | 8/2023 | Lesso | H02M 3/07 |
| | | | | 323/271 |
| 2023/0318447 | A1 * | 10/2023 | Lim | H02M 3/1586 |
| | | | | 323/271 |
| 2023/0353036 | A1 * | 11/2023 | Rizzolatti | H02M 7/4833 |
| 2024/0348163 | A1 * | 10/2024 | Lesso | H02M 3/1584 |

FOREIGN PATENT DOCUMENTS

| | | |
|---|---|---|
| CN | 111682755 | 9/2020 |
| CN | 112953225 | 6/2021 |

* cited by examiner

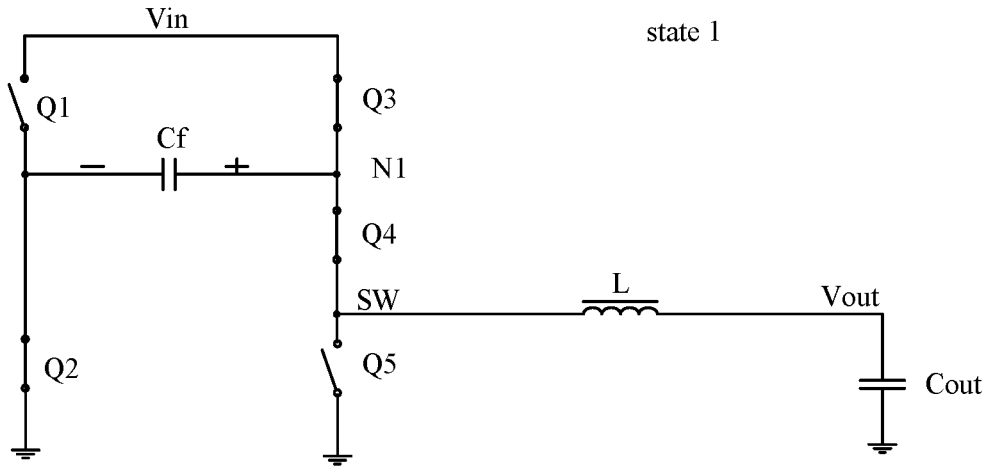
state 1
FIG. 5a
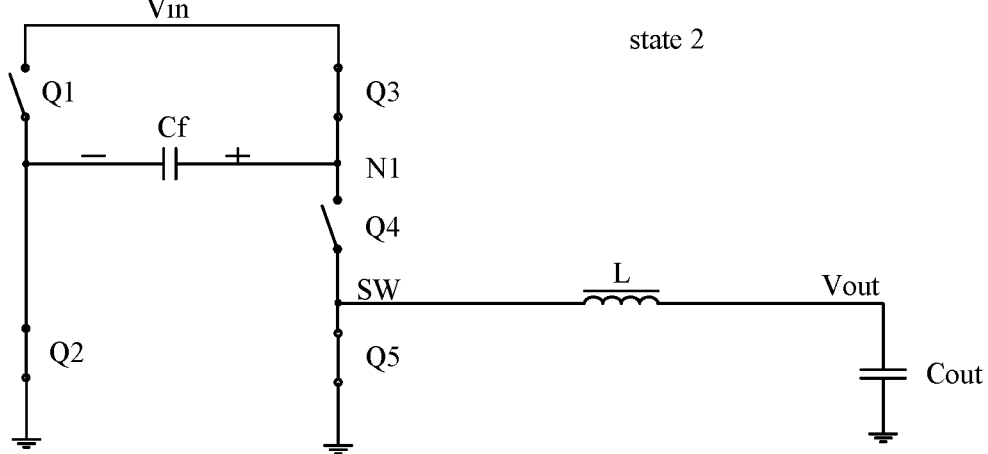
state 2
FIG. 5b
state 3
FIG. 5c

MULTI-MODE BUCK-BOOST CONVERTER AND CONTROL METHOD WITH SHARED CAPACITOR

CROSS-REFERENCE TO RELATED APPLICATION

The present application claims priority to a Chinese patent application No. 202211342913.2, filed on Oct. 31, 2022, and entitled "BUCK-BOOST CONVERTER AND CONTROL METHOD THEREFOR", the entire contents of which are incorporated herein by reference, including the specification, claims, drawings and abstract.

FIELD OF TECHNOLOGY

The present disclosure relates to a switching converter, and more particularly to a buck-boost converter and its control method.

BACKGROUND

A buck-boost converters is used to convert a DC input voltage into a DC output voltage, which can adjust the DC output voltage to be higher than, equal to or lower than the DC input voltage. An electronic device using the buck-boost converter can work in a wide input voltage range, so buck-boost converters are widely used in power supply fields.

FIG. 1 shows a schematic circuit diagram of a buck-boost converter according to the prior art. The buck-boost converter 100 includes four switches, an inductor, an input capacitor, and an output capacitor. The switch Q1 and the switch Q2 are coupled in series between the input terminal and ground, with an intermediate node SW1 between them. The switch Q3 and the switch Q4 are coupled in series between the output terminal and ground, with an intermediate node SW2 between them. The inductor L is coupled between node SW1 and node SW2. The input capacitor Cin is coupled between the input terminal and ground, and the output capacitor Cout is coupled between the output terminal and ground.

For the buck-boost converter shown in FIG. 1, when the input voltage Vin is higher than the output voltage Vout, the buck-boost converter operates in a buck mode; when the input voltage Vin is lower than the output voltage Vout, the buck-boost converter operates in a boost mode. In the buck mode, the switch Q4 remains off, the switch Q3 remains on, the switches Q1, Q2 and the inductor L constitute a buck topology, and the switches Q1 and Q2 are turned on and off complementarily under the control of a control signal. In the boost mode, the switch Q1 remains on, the switch Q2 remains off, the switches Q3, Q4 and the inductor L constitute a boost topology, and the switches Q3 and Q4 are turned on and off complementarily under the control of a control signal.

FIG. 2 shows operating waveforms of the buck-boost converter shown in FIG. 1 when the DC input voltage is close to the DC output voltage. Wherein, Vsw1 and Vsw2 represent voltages at nodes SW1 and SW2 respectively, Il represents an inductor current, Iq represents a current flowing through the switch Q3.

Here, the buck-boost converter operates in a buck-boost mode. In the buck-boost mode, the switches Q1 and Q2 are turned on and off complementarily under the control of a first control signal, the switches Q3 and Q4 are turned on and off complementarily under the control of a second control signal, and the switching cycles of the first control signal and the second control signal are the same. The switches Q1 to Q4 and the inductor L constitute a buck-boost topology. The charging stage of the inductor L is the first time period when the node SW1 is at a high level and the node SW2 is at a low level, and the discharging stage is the second time period when the node SW1 is at a low level and the node SW2 is at a high level. By changing duty cycles of the first control signal and the second signal, durations of the first time period and the second time period can be changed to control amount of energy transfer, thereby achieving constant voltage control or voltage regulation of the DC output voltage.

In boost mode and buck-boost mode, the switch Q3 changes its conduction state, when the switch Q3 is turned off, the current provided by the inductor L to the output terminal is discontinuous, which not only causes voltage ripple in the DC output voltage, but also causes discontinuous transitions between different conversion modes. In addition, an off state of the switch Q3 also causes a delayed change in an output current relative to a duty cycle change of the control signal.

Therefore, the conventional buck-boost converter has the advantages of high conversion efficiency and wide voltage adjustment range, but the disadvantages of discontinuous voltage transitions, large voltage ripples and slow dynamic response at the output terminal.

SUMMARY OF THE INVENTION

In view of the above problems, one object of the present disclosure is to provide a buck-boost converter and its control method, wherein a cascaded structure of a boost unit and a buck unit is utilized to achieve various voltage conversion modes. An inductor of the buck unit is coupled to an output terminal, which can not only achieve smooth transition of the DC output voltage, but also reduce output voltage ripple and improve dynamic response.

According to one aspect of the present disclosure, there is provided a buck-boost converter, comprising:

a boost unit having a first capacitor and a first group of switches; and a buck unit having an inductor and a second group of switches, wherein the boost unit and the buck unit are coupled in sequence between an input terminal and an output terminal, with a first node is formed therebetween and an inductor of the buck unit is coupled to the output terminal, the boost unit and the buck unit operate together in various states to achieve a buck mode, a boost mode and a buck-boost mode.

Optionally, the buck-boost converter further comprises: a second capacitor being coupled between the output terminal and ground, and being coupled to the inductor.

Optionally, in switching cycles of the buck mode, the first capacitor remains coupled between the input terminal and ground.

Optionally, the second group of switches are turned on and off according to a second control signal to control charging and discharging of the inductor to obtain a DC output voltage related to a duty cycle of the second control signal.

Optionally, in switching cycles of the boost mode, a first end of the first capacitor remains coupled to the inductor, and a second end switches between the input terminal and ground.

Optionally, the first group of switches are turned on and off according to a first control signal to control charging and discharging of the first capacitor to obtain a DC output voltage related to a duty cycle of the first control signal.

Optionally, in switching cycles of the buck-boost mode, a first end of the first capacitor switches between the input terminal and the inductor, and a second end of the first capacitor switches between the input terminal and ground.

Optionally, the first group of switches are turned on and off according to a first control signal, the second group of switches are turned on and off according to a second control signal to control charging and discharging of the first capacitor and the inductor to obtain a DC output voltage related to the duty cycles of the first control signal and the second control signal, the first control signal and the second control signal having the same switching period.

Optionally, the DC output voltage of the buck-boost converter in a steady state in continuous switching cycles is as follows:

$$Vout=2*D1*Vin+D2*Vin,$$

where Vout represents an output voltage, Vin represents an input voltage, D1 represents a duty cycle of the first control signal, and D2 represents a duty cycle of the second control signal.

Optionally, the first group of switches comprises:
a first switch and a second switch coupled in series between the input terminal and ground; and a third switch coupled between the input terminal and the first node, wherein the first capacitor is coupled between the first node and a node between the first switch and the second switch.

Optionally, the first switch to the third switch are field effect transistors, and wherein a parasitic diode of the third switch is reversely coupled between the first node and the input terminal.

Optionally, the first switch to the third switch are field effect transistors, and wherein the buck-boost converter further comprises an additional diode reversely coupled between the first node and the input terminal.

Optionally, a control terminal of the first switch receives a first control signal, and control terminals of the second switch and the third switch receive a complementary signal of the first control signal.

Optionally, the second group of switches comprises: a fourth switch and a fifth switch coupled in series between the first node and ground, wherein the inductor is coupled between the output terminal and a node between the fourth switch and the fifth switch.

Optionally, a control terminal of the fourth switch receives a second control signal, and a control terminal of the fifth switch receives a complementary signal of the second control signal.

Optionally, the first group of switches and the second group of switches are each selected from the group consisting of field effect transistors and bipolar transistors.

According to a second aspect of the present disclosure, there is provided a control method for a buck-boost converter, the buck-boost converter comprising a first capacitor and an inductor, the control method comprising:
selecting a conversion mode according to a relationship between a DC input voltage and a DC output voltage, the conversion mode being one of a buck mode, a boost mode and a buck-boost mode;
controlling connections of the first capacitor and the inductor and their charging and discharging processes according to the selected conversion mode, so as to obtain a corresponding DC output voltage,
wherein in switching cycles of the buck mode, the first capacitor remains coupled between an input terminal and ground, in switching cycles of the boost mode, a first end of the first capacitor remains coupled to the inductor, and a second end of the first capacitor switches between the input terminal and ground, in switching cycles of the buck-boost mode, a first end of the first capacitor switches between the input terminal and the inductor, and a second end of the first capacitor switches between the input terminal and ground.

Optionally, the buck-boost converter further comprises a second capacitor coupled between the output terminal and ground, and the output terminal is coupled to the inductor.

Optionally, the first capacitor switches between charging and discharging states according to a first control signal, the inductor switches between charging and discharging states according to a second control signal, and the first control signal and the second control signal have the same switching period.

Optionally, the DC output voltage of the buck-boost converter in a steady state in continuous switching cycles is as follows:

$$Vout=2*D1*Vin+D2*Vin,$$

where Vout represents an output voltage, Vin represents an input voltage, D1 represents a duty cycle of the first control signal, and D2 represents a duty cycle of the second control signal.

In the buck-boost converter according to the embodiments of the present disclosure, a boost unit and a buck unit are coupled in sequence between an input terminal and an output terminal as a cascaded structure. The boost unit and the buck unit operate together in various states to achieve multiple voltage conversion modes. An inductor of the buck unit in the buck-boost converter is coupled to an output terminal. In the boost mode and the buck-boost mode, one end of the inductor has a voltage swing of Vin to 2*Vin, and the other end is always coupled to the output terminal to provide a DC output voltage. Therefore, not only can it achieve a smooth transition of the DC output voltage, but also reduce voltage ripple and improve dynamic response speed.

In a preferred embodiment, the first switch to the third switch are field effect transistors, and the buck-boost converter further comprises an additional diode reversely coupled between the first node and the input terminal. The additional diode blocks a current path between the first node and the input when the voltage at the first node is 2*Vin, so that the boost unit operates normally, and the circuit conversion efficiency of the boost unit is improved.

In a preferred embodiment, the first switch to the third switch are field effect transistors, and a parasitic diode of the third switch is reversely coupled between the first node and the input. Even without adding a new diode in the boost unit, the unidirectional conductivity characteristic of the parasitic diode of the third switch can be utilized to block the current path between the first node and the input when the voltage at the first node is 2*Vin, so that the boost unit operates normally, and the circuit conversion efficiency of the boost unit is improved.

BRIEF DESCRIPTION OF THE DRAWINGS

The above and other objectives, features and advantages of the present disclosure will become more apparent through the following detailed description of embodiments of the present disclosure with reference to the attached drawings, in which:

FIGS. 5a, 5b and 5c show schematic circuit diagrams of states 1, 2 and 3 of the buck-boost converter according to the embodiment of the present disclosure, respectively.

DESCRIPTION OF THE EMBODIMENTS

The following embodiments are described for illustrating the present disclosure, but the present disclosure is not limited to these embodiments. In the following detailed description of the present disclosure, numerous specific details are described to provide a thorough understanding of the present disclosure. However, it will be obvious to those skilled in the art that the invention may be practiced without these specific details. In order not to obscure the essence of the present disclosure, well-known methods, procedures, processes, elements and circuits have not been described in detail.

In addition, those of ordinary skill in the art should understand that the drawings provided herein are for illustrative purposes and are not necessarily drawn to scale. Also, it should be understood that in the following description, a "circuit" refers to a conductive path comprising at least one element or sub-circuit coupled together electrically or electromagnetically. When an element or circuit is referred to as being "coupled to" another element, or when an element/circuit is referred to as being "coupled between" two nodes, it can be directly coupled to the other element or there may be intermediate elements between them, with the elements being coupled physically, logically, or in combination thereof. In contrast, when an element is referred to as being "directly coupled to" or "directly coupled to" another element, it means no intervening elements are present.

Unless the context clearly requires otherwise, throughout the specification and claims, the words "comprise", "comprising", and the like are to be construed in an inclusive sense as opposed to an exclusive or exhaustive sense; that is to say, in the sense of "including, but not limited to". In the description of the present disclosure, it should be understood that the terms "first," "second," etc. are used for descriptive purposes only and are not to be construed as indicating or implying relative importance or significance. Furthermore, in the description of the present disclosure, unless otherwise specified, the meaning of "a plurality of" is two or more.

In this application, the terms "high level" and "low level" of a control signal refer to signal levels for turning on and off a switch, respectively. For example, when the switch is an N-type field effect transistor, the control signal is a gate-source voltage of the N-type field effect transistor. The "high level" of the control signal means the gate-source voltage is greater than a threshold voltage of the N-type field effect transistor. The "low level" of the control signal means the gate-source voltage is less than the threshold voltage of the N-type field effect transistor.

Figure 1:
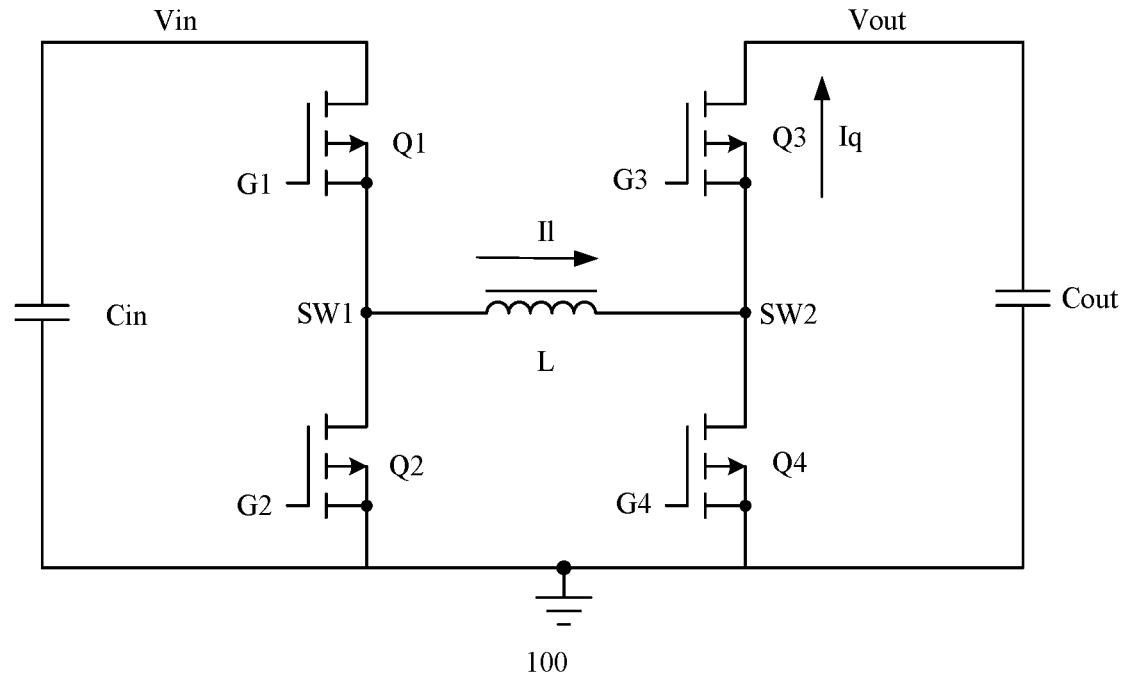
FIG. 1 shows a schematic circuit diagram of a buck-boost converter according to the prior art.
Figure 2:
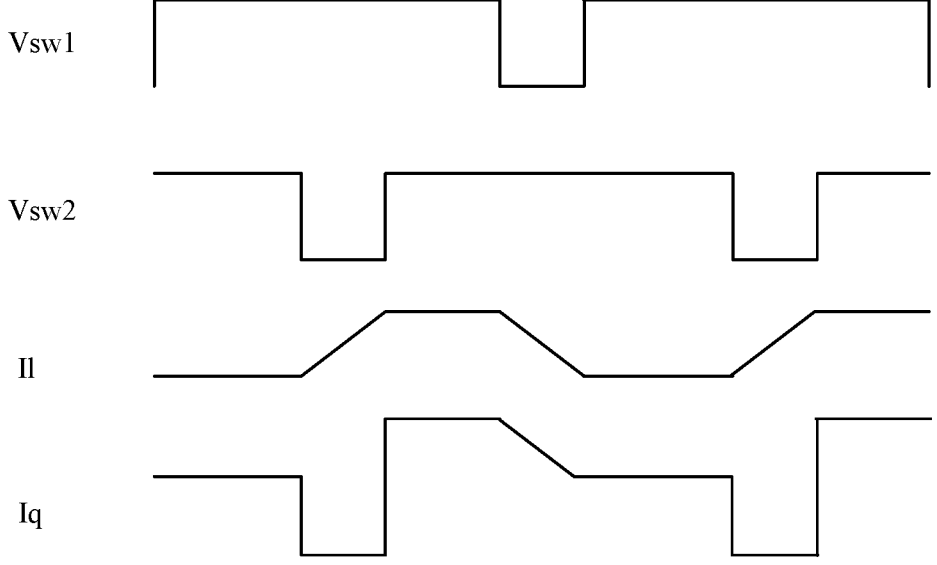
FIG. 2 shows an operating waveform chart of the buck-boost converter shown in FIG. 1 when a DC input voltage is close to a DC output voltage.
Figure 3:
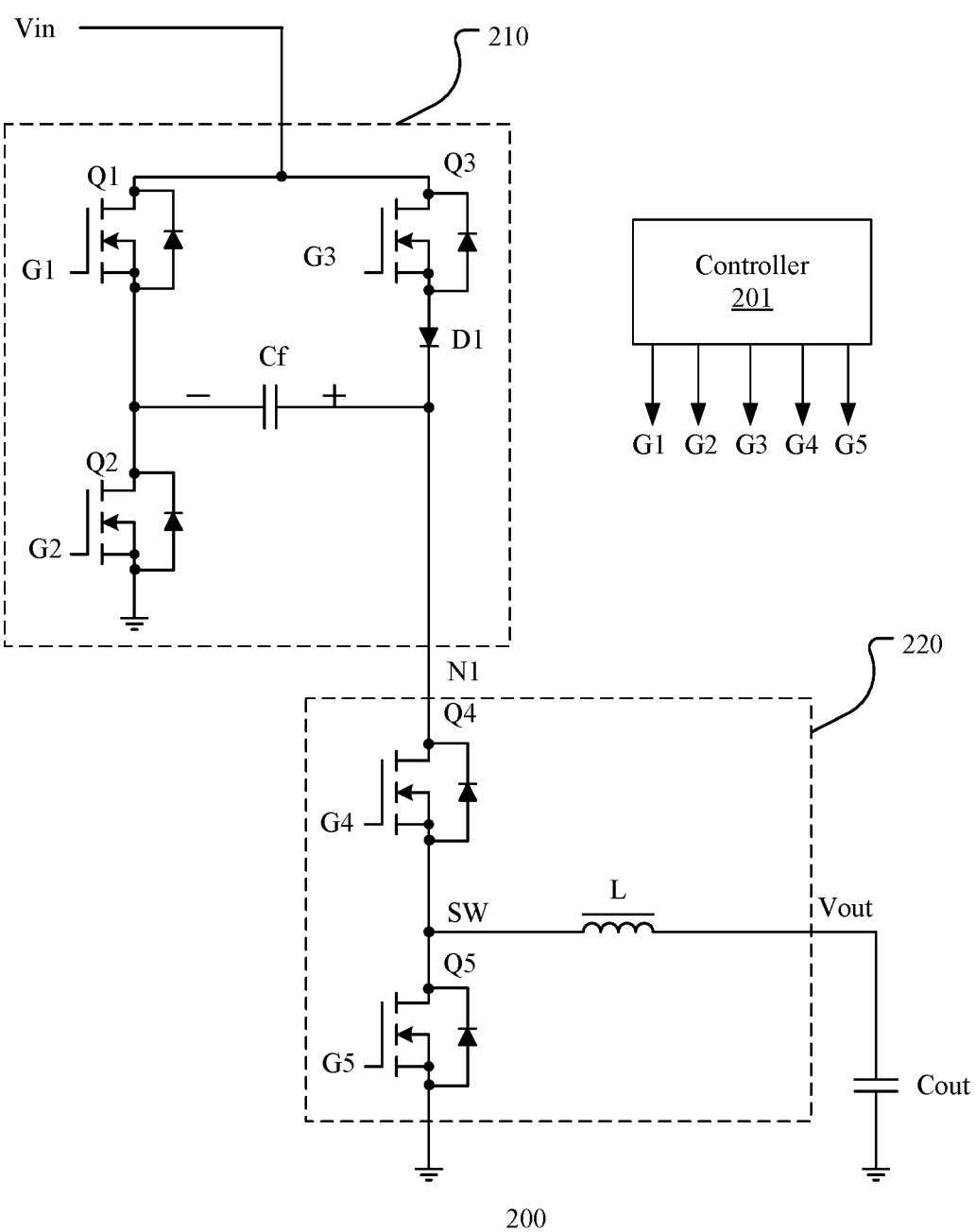
FIG. 3 shows a schematic circuit diagram of a buck-boost converter according to a first embodiment of the present disclosure.

FIG. 3 shows a schematic circuit diagram of a buck-boost converter according to a first embodiment of the present disclosure. The buck-boost converter 200 receives a DC input voltage Vin at an input terminal and provides a DC output voltage Vout at an output terminal. The buck-boost converter 200 includes a boost unit 210, a buck unit 220, and an output capacitor Cout. The boost unit 210 and the buck unit 220 are coupled in sequence between the input terminal and the output terminal, forming a node N1 between them. The output capacitor Cout is coupled between the output terminal and ground, and is directly coupled to the inductor L. The boost unit 210 includes switches Q1 to Q3, a capacitor Cf, and a diode D1. The buck unit 220 includes switches Q4, Q5 and an inductor L.

In the buck-boost converter 200, the switches Q1 and Q2 are coupled in series between the input terminal and ground. The switch Q3 and the diode D1 are coupled in series between the input terminal and node N1, see FIG. 3. When the switch Q3 is an N-type or a P-type field effect transistor, one of the source and drain of the switch Q3 is coupled to the input terminal, and the other of the source and drain is coupled to the anode of the diode D1. The cathode of the diode D1 is coupled to node N1. The capacitor Cf is coupled between a node between switches Q1 and Q2 and node N1. The switches Q4 and Q5 are coupled in series between node N1 and ground. A common connection point between switches Q4 and Q5 is node SW. The inductor L is coupled between node SW and the output terminal.

Figure 4:
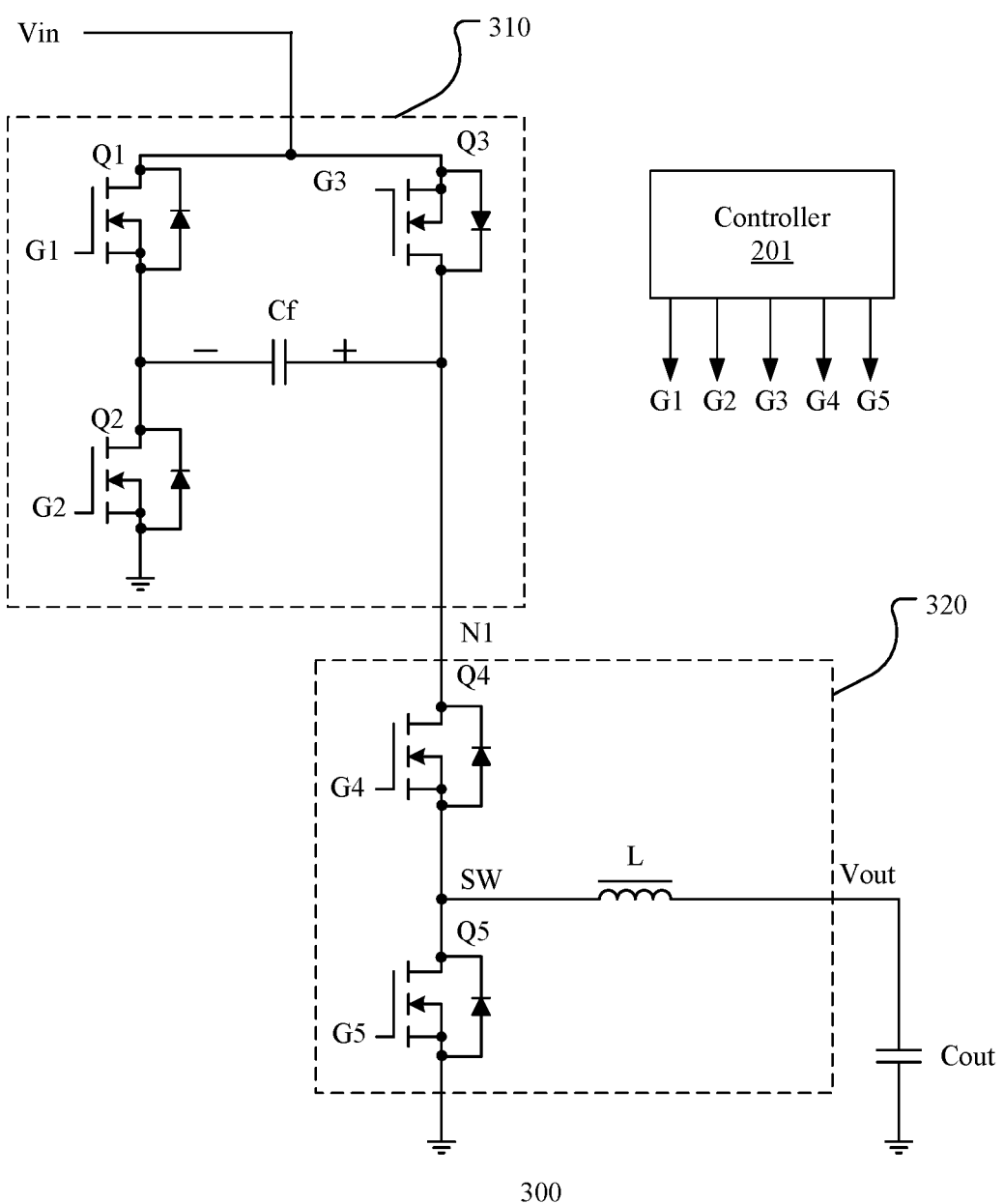
FIG. 4 shows a schematic circuit diagram of a buck-boost converter according to a second embodiment of the present disclosure.

FIG. 4 shows a schematic circuit diagram of a buck-boost converter according to a second embodiment of the present disclosure. The buck-boost converter 300 receives a DC input voltage Vin at an input terminal and provides a DC output voltage Vout at an output terminal. The buck-boost converter 300 includes a boost unit 310, a buck unit 320, and an output capacitor Cout. The boost unit 310 and the buck unit 320 are coupled in sequence between the input terminal and the output terminal, forming a node N1 between them. The output capacitor Cout is coupled between the output terminal and ground, and is directly coupled to the inductor L. The boost unit 310 includes switches Q1 to Q3 and a capacitor Cf. The buck unit 320 includes switches Q4, Q5 and an inductor L.

In the buck-boost converter 300, the switches Q1 and Q2 are coupled in series between the input terminal and ground. The switch Q3 is coupled between the input terminal and node N1, and a parasitic diode of the switch Q3 is reversely coupled between node N1 and the input terminal. FIG. 4, when the switch Q3 is an N-type or a P-type field effect transistor, a source of the switch Q3 is coupled to the input terminal, a drain is coupled to node N1. Accordingly, an anode of the parasitic diode of the switch Q3 is coupled to the input terminal, and the cathode is coupled to node N1, so that the parasitic diode is reversely coupled between node N1 and the input terminal. The capacitor Cf is coupled between a node between switches Q1 and Q2 and node N1. The switches Q4 and Q5 are coupled in series between node N1 and ground. A common connection point between switches Q4 and Q5 is node SW. The inductor L is coupled between node SW and the output terminal.

In the embodiment of the present disclosure, because the inductor L is coupled to the output terminal and there is continuity of inductor current, the current flowing to the output capacitor of the buck-boost converter at the output terminal is continuous. Therefore, not only can it achieve a smooth transition of the DC output voltage, but also reduce voltage ripple and improve dynamic response speed.

In the present disclosure, the switches include any one of field effect transistors and bipolar transistors. In the first and second embodiments of the present disclosure, the switches are for example N-type MOSFETs, but are not limited thereto. The gates of the switches Q1 to Q5 receive control signals G1 to G5. The control signals G1 to G5 are generated by a controller 201. For clarity, a control circuit for generating the control signals G1 to G5 is not shown in the figure. As described below, the control circuit can adjust the duty cycle of the control signals G1 to G5 to change a proportional relationship between the DC output voltage Vout and the DC input voltage Vin, so as to obtain an expected DC output voltage Vout.

During operation of the buck-boost converter, as the control signals G1 to G5 change, on and off states of the switches Q1 to Q5 changes accordingly, resulting in different connections of the capacitor Cf and the inductor L, so that the buck-boost converter of the present disclosure operates in three different operating states.

As shown in FIG. 5a, in state 1, the switches Q2, Q3, Q4 are turned on, the switches Q1, Q5 are turned off, the capacitor Cf is coupled between the input and ground, the inductor L is coupled between the input terminal and the output terminal.

As shown in FIG. 5b, in state 2, the switches Q2, Q3, Q5 are turned on, Q1, Q4 are turned off, the capacitor Cf is coupled between the input terminal and ground, the inductor L is coupled between the output terminal and ground.

As shown in FIG. 5c, in state 3, the switches Q1, Q4 are turned on, Q2, Q3, Q5 are turned off, the capacitor Cf and the inductor L are coupled in series between the input terminal and the output terminal.

According to a relationship between the input voltage Vin and the output voltage Vout, the controller 201 outputs control signals G1 to G5 which change periodically with time, so that the buck-boost converter switches between different operating states, thereby changing the connection and charging/discharging states of the capacitor Cf and the inductor L to achieve various voltage conversion modes of the buck-boost converter.

Figures 6A, 6B, 6C:
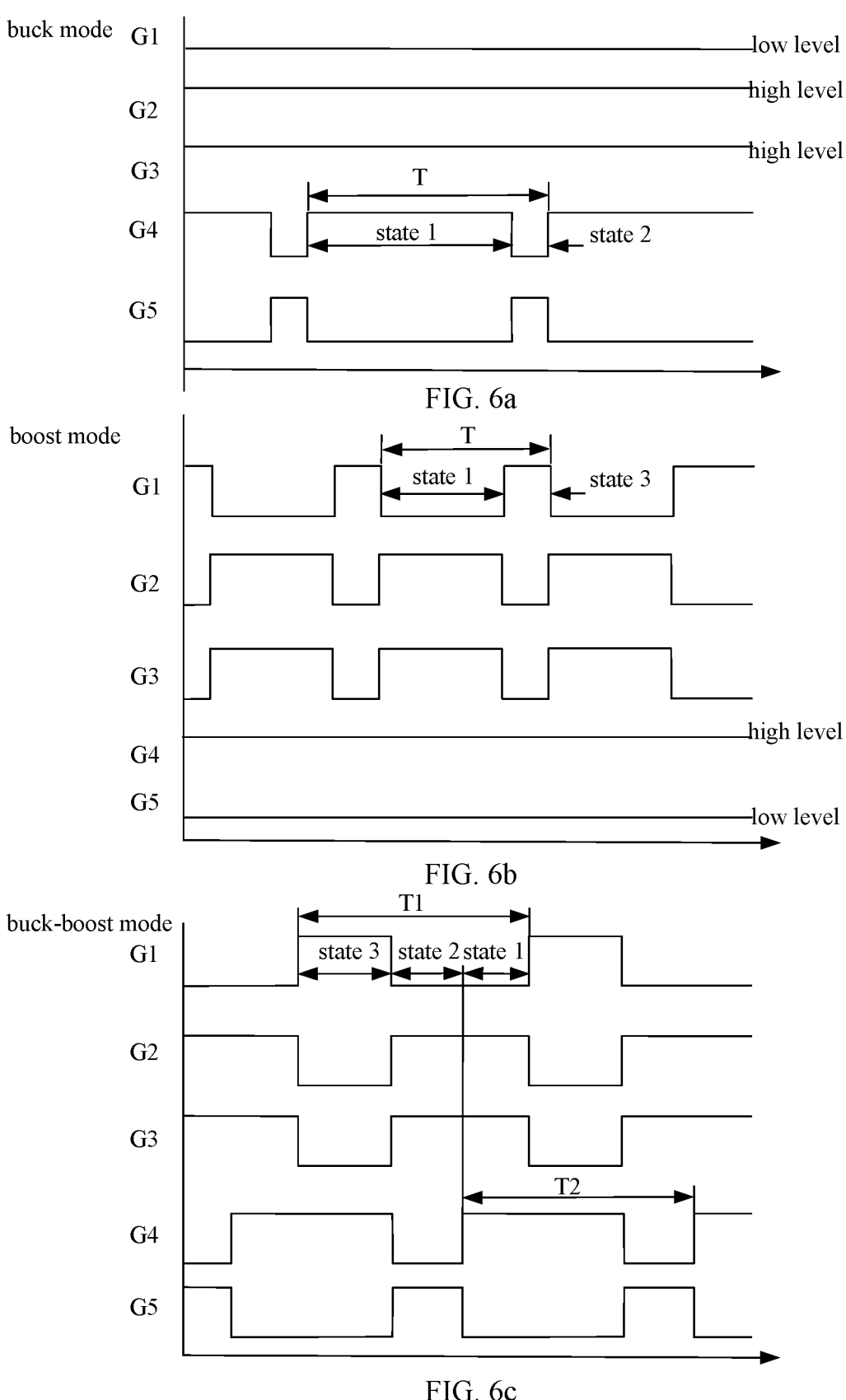
FIGS. 6a, 6b and 6c show operating waveform charts of the buck-boost converter according to embodiments of the present disclosure in a buck mode, a boost mode and a buck-boost mode, respectively.

As shown in FIG. 6a, when the input voltage Vin is higher than the output voltage Vout, the buck-boost converter operates in a buck mode. In the buck mode, the switch Q1 remains turned off continuously, the switches Q2 and Q3 remain turned on continuously, keeping the capacitor Cf coupled between the input terminal and ground. The input voltage Vin charges the capacitor Cf, so that the voltage across the capacitor Cf is approximately equal to the input voltage Vin.

The switches Q4, Q5 and the inductor L constitute a buck converter module. The time period during which the control signal turns the switches on and off once is defined as one switching cycle T of the control signal. The switch Q4 is turned on and off by a control signal with a duty cycle D2. The switch Q5 is turned on and off in a complementary way to the switch Q4 under the control signal. When the switch Q4 is turned on and the switch Q5 is turned off, the buck converter operates in state 1, the inductor L is coupled between the input terminal and the output terminal, and the input voltage Vin charges the inductor L. At the same time, the inductor L delivers energy to the output terminal of the buck converter. Here, the voltage at node N1 is the same as the voltage at node SW, both of which are equal to Vin. When the switch Q4 is turned off and the switch Q5 is turned on, the buck converter operates in state 2, the inductor L is coupled between the output terminal and ground, and the inductor L discharges energy to the output terminal.

In continuous switching cycles, the voltage across the inductor L is determined by the switching node voltage Vsw at one end and the output voltage Vout at the other end. According to a volt-second balance principle of the inductor, it can be understood that when the converter operates in a buck mode, in continuous switching cycles, the output voltage Vout of the buck converter at a steady state is shown in equation (1):

$$Vout = D2 * Vin \qquad (1)$$

where Vin represents an input voltage, and D2 represents a duty cycle of the control signal for the switch Q4.

The switching converter according to the embodiment of the present disclosure operates as a buck converter, and provides an output voltage Vout proportional to the input voltage Vin. Furthermore, by adjusting the duty cycle D2 of the control signal, an expected output voltage can be obtained. Therefore, the power converter can achieve an expected conversion ratio in a buck mode.

As shown in FIG. 6b, when the input voltage Vin is lower than the output voltage Vout, the buck-boost converter operates in a boost mode. In the boost mode, the switch Q4 remains turned on continuously, the switch Q5 remains turned off continuously, keeping the first end of the capacitor Cf coupled with the inductor L. The voltage at node N1 is the same as the voltage at node SW.

The switches Q1 to Q3 and capacitor Cf constitute a boost unit. The time period during which the control signal turns the switches on and off once is defined as one switching cycle T of the control signal. The switch Q1 is turned on and off by a control signal with a duty cycle D1. In the same cycle, the switches Q2 and Q3 have the same state, and switch on and off states in a complementary way to the switch Q1 under the control signal. When the switch Q1 is turned off and the switches Q2 and Q3 are turned on, the buck-boost converter operates in state 1, the capacitor Cf is coupled between the input terminal and ground, the inductor L is coupled between the input terminal and the output terminal, so that the input voltage Vin charges the capacitor Cf and the inductor L. At the same time, the inductor L delivers energy to the output terminal of the buck-boost converter. Here, the voltage at node N1 equals the voltage at node SW, both of which are equal to Vin. The voltage across the capacitor Cf is approximately Vin. When the switch Q1 is turned on and the switches Q2 and Q3 are turned off, the buck-boost converter operates in state 3, the capacitor Cf and the inductor L are coupled in series between the input terminal and the output terminal, so that the input voltage Vin charges the capacitor Cf and the inductor L. At the same time, the capacitor Cf discharges to charge the inductor L. Energy is delivered to the output terminal of the buck-boost converter through the inductor L. Here, the voltage at node N1 equals the voltage at node SW, both of which are equal to 2*Vin.

In the first embodiment of the present disclosure, the unidirectional conduction of diode D1 blocks the current path between node N1 and the input terminal when the voltage at node N1 is 2*Vin, thereby ensuring normal operation of the boost unit and improving the circuit conversion efficiency of the boost unit.

In the second embodiment of the present disclosure, because the parasitic diode of the switch Q3 is reversely coupled between node N1 and the input, even without adding a new diode in the boost unit, the unidirectional conduction of the parasitic diode of the switch Q3 can be utilized to block the current path between node N1 and the input terminal when the voltage at node N1 is 2*Vin, thereby ensuring normal operation of the boost unit and improving the circuit conversion efficiency of the boost unit.

In continuous switching cycles, the voltage across the inductor L is determined by the switching node voltage Vsw at one end and the output voltage Vout at the other end. According to a volt-second balance principle of the inductor, it can be understood that when the converter operates in a boost mode, in continuous switching cycles, the output voltage Vout of the converter at a steady state is shown in equation (2):

$$Vout=(D1+1)*Vin \qquad (2)$$

where Vin represents an input voltage, and D1 represents a duty cycle of the control signal for the switch Q1.

The switching converter according to the embodiment operates as a boost converter, and provides an output voltage Vout proportional to the input voltage Vin. Furthermore, by adjusting the duty cycle D1 of the control signal, an expected output voltage can be obtained. Therefore, the power converter can achieve an expected conversion ratio in a boost mode.

As shown in FIG. 6c, when the input voltage Vin is close to or equal to the output voltage Vout, the buck-boost converter operates in a buck-boost mode. In the buck-boost mode, the time period during which the control signal turns the switch Q1 on and off once is defined as one switching cycle T1. The switch Q1 is turn on and off by a control signal with a duty cycle D1. In the same cycle, the switches Q2 and Q3 have the same state, and switch on and off states in a complementary way to the switch Q1 under the control signal. The switches Q4, Q5 and the inductor L constitute a buck converter topology. The time period during which the control signal turns the switch Q4 on and off once is defined as one switching cycle T2, and the switch Q4 is controlled by a control signal with a duty cycle D2. In the same cycle, the switch Q5 is turned on and off in a complementary way to the switch Q4 under the control signal. The switching cycles T1 and T2 of the control signals for the switches Q1 and Q4 are the same.

In one switching cycle, for example, when the switches Q1 and Q4 are turned on, and the switches Q2, Q3 and Q5 are turned off, the buck-boost converter operates in state 3. The capacitor Cf and the inductor L are coupled in series between the input terminal and the output terminal. The input voltage Vin charges the capacitor Cf and the inductor L. At the same time, the capacitor Cf discharges to charge the inductor L. Energy is delivered to the output terminal via L. Here, the voltage at node N1 equals the voltage at node SW, both of which are equal to 2*Vin. When the switches Q1 and Q4 are turned off, and the switches Q2, Q3 and Q5 are turned on, the converter operates in state 2. The capacitor Cf is coupled between the input terminal and ground, and the inductor L is coupled between the output terminal and ground. The inductor L discharges energy to the output terminal. When the switches Q1 and Q5 are turned off, and the switches Q2, Q3 and Q4 are turned on, the converter operates in state 1. The capacitor Cf is coupled between the input terminal and ground, and the inductor L is coupled between the input terminal and the output terminal. The input voltage Vin charges the capacitor Cf and the inductor L. Energy is delivered to the output terminal through the inductor L. Here, the voltage at node N1 equals the voltage at node SW, both of which are equal to Vin, and the voltage across the capacitor Cf is approximately Vin.

In the first embodiment of the present disclosure, the unidirectional conduction of diode D1 blocks the current path between node N1 and the input terminal when the voltage at node N1 is 2*Vin, thereby ensuring normal operation of the boost unit and improving the circuit conversion efficiency of the boost unit.

In the second embodiment of the present disclosure, because the parasitic diode of the switch Q3 is reversely coupled between node N1 and the input, even without adding a new diode in the boost unit, the unidirectional conduction of the parasitic diode of the switch Q3 can be utilized to block the current path between node N1 and the input terminal when the voltage at node N1 is 2*Vin, thereby ensuring normal operation of the boost unit and improving the circuit conversion efficiency of the boost unit.

In continuous switching cycles, the voltage across the inductor L is determined by the switching node voltage Vsw at one end and the output voltage Vout at the other end. According to a volt-second balance principle of the inductor, it can be understood that when the converter operates in a buck-boost mode, in continuous switching cycles, the output voltage Vout of the converter at a steady state is shown in equation (3):

$$Vout=2*D1*Vin+D2*Vin \qquad (3)$$

where Vout represents an output voltage, Vin represents an input voltage, D1 represents a duty cycle of the control signal for switch Q1, and D2 represents a duty cycle of the control signal for switch Q4.

The switching converter according to the embodiment operates as a buck-boost converter and provides an output voltage Vout proportional to the input voltage Vin. Furthermore, by adjusting duty cycles D1 and D2 of the control signals, an expected output voltage can be obtained. Therefore, the power converter can achieve an expected conversion ratio. Moreover, by utilizing the buck-boost mode and adjusting the duty cycles D1 and/or D2, a smooth transition of the output voltage can be achieved when the operating mode of the switching converter changes.

Figure 7:
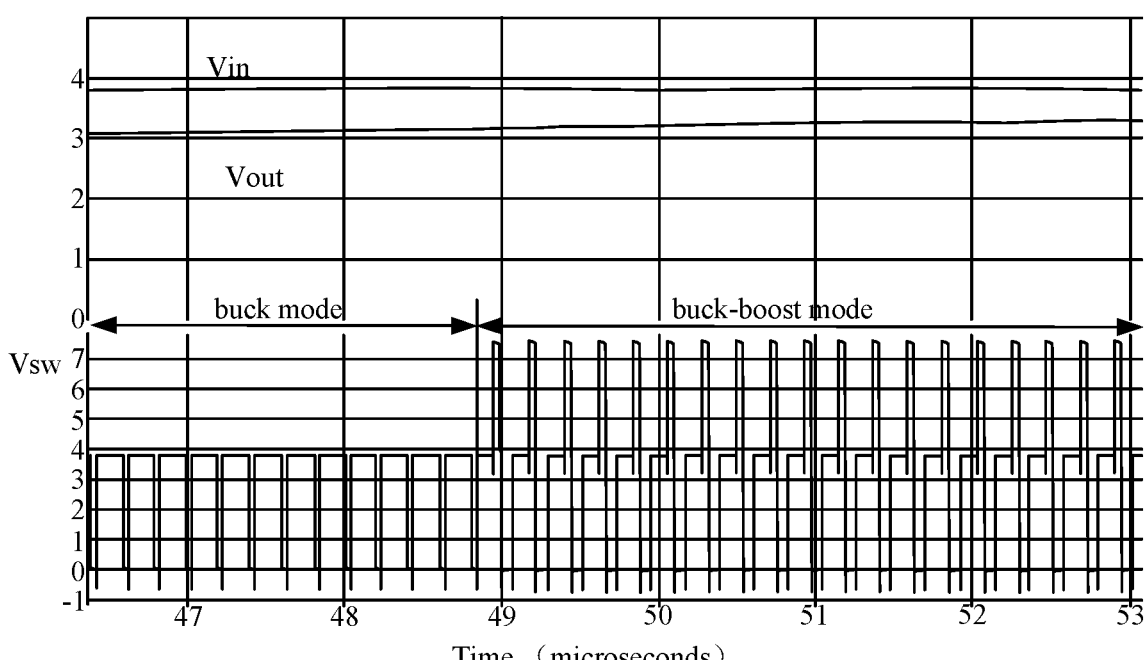
FIG. 7 shows a circuit simulation result of the buck-boost converter according to the embodiment of the present disclosure when a DC input voltage is higher than a DC output voltage.
Figure 8:
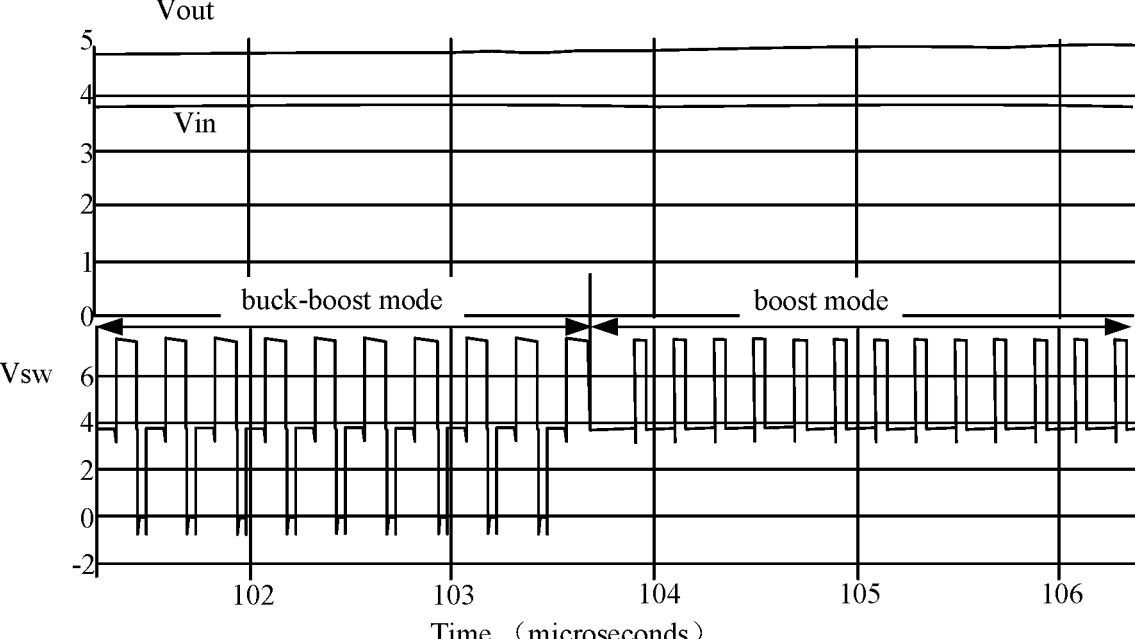
FIG. 8 shows a circuit simulation result of the buck-boost converter according to the embodiment of the present disclosure when a DC input voltage is lower than a DC output voltage.

FIGS. 7 and 8 show simulation results of the buck-boost switching converter according to the embodiment of the present disclosure, taking the DC input voltage Vin=3.8V as an example, when the DC input voltage Vin is higher or lower than the DC output voltage. The switching node voltage Vsw corresponds to the control signal of the switches, and the duty cycle of this control signal varies continuously with a small amplitude. That is, FIGS. 7 and 8 are the cases that an output voltage of the buck-boost switching converter according to the embodiment of the present disclosure varies continuously as a duty cycle of the switch control signal changes continuously.

When the input voltage Vin is higher than the output voltage Vout, as shown in FIG. 7, the switching converter operates in a buck mode. Here, the switching converter switches its operating states between state 1 and state 2, so that the switching node voltage Vsw at node SW oscillates between 0 to Vin (i.e., 0V-3.8V). As the output voltage Vout gradually increases and approaches the input voltage Vin, the switching converter switches to a buck-boost mode, with operating states being switched between states 1, 2 and 3, so that the switching node voltage Vsw at node SW oscillates between 0 to 2*Vin (i.e., 0V-7.6V).

When the input voltage Vin is lower than the output voltage Vout, as shown in FIG. 8, as the output voltage Vout approaches and becomes higher than the input voltage Vin, the switching converter operates in a buck-boost mode. Here, the switching converter switches its operating states between states 1, 2 and 3, so that the switching node voltage Vsw at node SW oscillates between 0 to 2*Vin (i.e., 0V-7.6V). As the output voltage Vout further increases and becomes significantly higher than the input voltage Vin, the switching converter switches to a boost mode, with operating states being switched between states 1 and 3, so that the switching node voltage Vsw at node SW oscillates between Vin and 2*Vin (i.e., 3.8V-7.6V).

Furthermore, in both the boost mode and the buck-boost mode, the oscillation amplitude of the switching node voltage Vsw can reach from Vin to 2*Vin, while the other end is always coupled to the output terminal to provide a DC output voltage. Therefore, not only can it achieve a smooth transition of the DC output voltage, but also reduce voltage ripple and improve dynamic response speed.

Finally, it should be noted that the above embodiments are merely examples for clearly demonstrating the present disclosure, rather than limitations on the embodiments. For those of ordinary skill in the art, based on the above descriptions, other variations or modifications may be made in different forms. It is unnecessary and infeasible to enumerate all embodiments here. Any obvious variations or modifications derived from the present disclosure are still within the protection scope of the present disclosure.

The invention claimed is:

1. A buck-boost converter, comprising:
a boost unit having a first capacitor and a first group of switches; and
a buck unit having an inductor and a second group of switches,
wherein the boost unit and the buck unit are coupled in sequence between an input terminal and an output terminal, with a first node being formed therebetween and the inductor of the buck unit is coupled to the output terminal,
the boost unit and the buck unit operate together in various states to achieve a buck mode, a boost mode and a buck-boost mode, such that:
in switching cycles of the buck mode, the boost unit is used to couple the input terminal with the first node, and to couple the first capacitor between the input terminal and ground,
in switching cycles of the buck-boost mode, a first end of the first capacitor switches between the input terminal and the inductor, and a second end of the first capacitor switches between the input terminal and ground,
wherein the first group of switches are turned on and off according to a first control signal, the second group of switches are turned on and off according to a second control signal to control charging and discharging of the first capacitor and the inductor to obtain a DC output voltage related to the duty cycles of the first control signal and the second control signal, the first control signal and the second control signal having the same switching period,
wherein the DC output voltage of the buck-boost converter in a steady state in continuous switching cycles is as follows:

$$V_{out} = 2 * D1 * V_{in} + D2 * V_{in},$$

where Vout represents an output voltage, Vin represents an input voltage, D1 represents a duty cycle of the first control signal, and D2 represents a duty cycle of the second control signal.

2. The buck-boost converter according to claim 1, further comprising:
a second capacitor being coupled between the output terminal and ground, and being coupled to the inductor.

3. The buck-boost converter according to claim 2, wherein in switching cycles of the boost mode, a first end of the first capacitor remains coupled to the inductor, and a second end switches between the input terminal and ground.

4. The buck-boost converter according to claim 3, wherein the first group of switches are turned on and off according to a first control signal to control charging and discharging of the first capacitor to obtain a DC output voltage related to a duty cycle of the first control signal.

5. The buck-boost converter according to claim 1, wherein the first group of switches comprises:
a first switch and a second switch coupled in series between the input terminal and ground; and
a third switch coupled between the input terminal and the first node,
wherein the first capacitor is coupled between the first node and a node between the first switch and the second switch.

6. The buck-boost converter according to claim 5, wherein the first switch to the third switch are field effect transistors, and wherein a parasitic diode of the third switch is reversely coupled between the first node and the input terminal.

7. The buck-boost converter according to claim 5, wherein the first switch to the third switch are field effect transistors, and wherein the buck-boost converter further comprises an additional diode reversely coupled between the first node and the input terminal.

8. The buck-boost converter according to claim 5, wherein a control terminal of the first switch receives a first control signal, and control terminals of the second switch and the third switch receive a complementary signal of the first control signal.

9. The buck-boost converter according to claim 1, wherein the second group of switches comprises:
a fourth switch and a fifth switch coupled in series between the first node and ground,
wherein the inductor is coupled between the output terminal and a node between the fourth switch and the fifth switch.

10. The buck-boost converter according to claim 9, wherein a control terminal of the fourth switch receives a second control signal, and a control terminal of the fifth switch receives a complementary signal of the second control signal.

11. The buck-boost converter according to claim 1, wherein the first group of switches and the second group of switches are each selected from the group consisting of field effect transistors and bipolar transistors.

12. A control method for a buck-boost converter, the buck-boost converter comprising a first capacitor and an inductor, the control method comprising:
selecting a conversion mode according to a relationship between a DC input voltage and a DC output voltage, the conversion mode being one of a buck mode, a boost mode and a buck-boost mode;
controlling connections of the first capacitor and the inductor and their charging and discharging processes according to the selected conversion mode, so as to obtain a corresponding DC output voltage, wherein in switching cycles of the buck mode, the input terminal is coupled with the first node and the first capacitor remains coupled between an input terminal and ground, in switching cycles of the boost mode, a first end of the first capacitor remains coupled to the inductor, and a second end of the first capacitor switches between the input terminal and ground, in switching cycles of the buck-boost mode, a first end of the first capacitor switches between the input terminal and the inductor, and a second end of the first capacitor switches between the input terminal and ground, wherein the first capacitor switches between charging and discharging states according to a first control signal, the inductor switches between charging and discharging states according to a second control signal, and the first control signal and the second control signal have the same switching period, wherein the DC output voltage of the buck-boost converter in a steady state in continuous switching cycles is as follows:

$$Vout=2*D1*Vin+D2*Vin,$$

where Vout represents an output voltage, Vin represents an input voltage, D1 represents a duty cycle of the first control signal, and D2 represents a duty cycle of the second control signal.

13. The control method according to claim 12, wherein the buck-boost converter further comprises a second capacitor coupled between the output terminal and ground, and the output terminal is coupled to the inductor.

\* \* \* \* \*